(12) United States Patent
Shang et al.

(10) Patent No.: US 12,417,404 B2
(45) Date of Patent: Sep. 16, 2025

(54) CROSS-MODAL SEMI-SUPERVISED DATA LABELING

(71) Applicant: International Business Machines Corporation, Armonk, NY (US)

(72) Inventors: Bin Shang, Xian (CN); Xue Ying Zhang, Xian (CN); Yang Liang, Beijing (CN); Na Liu, Xian (CN); Chen Yu Chang, Xian (CN); Fei Qi, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 17/108,240

(22) Filed: Dec. 1, 2020

(65) Prior Publication Data
US 2022/0172106 A1   Jun. 2, 2022

(51) Int. Cl.
  *G06N 20/00*   (2019.01)
  *G06F 16/28*   (2019.01)

(52) U.S. Cl.
  CPC ........... *G06N 20/00* (2019.01); *G06F 16/285* (2019.01)

(58) Field of Classification Search
  CPC .............................. G06N 20/00; G06F 16/285
  USPC .......................................................... 706/12
  See application file for complete search history.

(56) References Cited

U.S. PATENT DOCUMENTS

| | | | |
|---|---|---|---|
| 8,386,574 B2 | 2/2013 | Chidlovskii | |
| 2019/0095758 A1 | 3/2019 | Liu | |
| 2019/0318202 A1* | 10/2019 | Zhao | G06F 18/214 |
| 2021/0406601 A1* | 12/2021 | Narlikar | G06F 16/45 |

FOREIGN PATENT DOCUMENTS

| | | | | |
|---|---|---|---|---|
| CN | 105760507 B | | 7/2016 | |
| CN | 110647904 A | | 1/2020 | |
| CN | 110807086 A | | 2/2020 | |
| CN | 111143625 A | * | 5/2020 | G06F 16/9014 |

OTHER PUBLICATIONS

Mandal, D. K., et al. "Label Prediction Framework for Semi-Supervised Cross-Modal Retrieval." arXiv (Cornell University), May 2019, https://doi.org/10.48550/arxiv.1905.11139. (Year: 2019).*

(Continued)

*Primary Examiner* — Stephen S Hong
*Assistant Examiner* — Broderick C Anderson
(74) *Attorney, Agent, or Firm* — Randy Tejeda (57) ABSTRACT

One or more computer processors extract respective features for each inter-modal sample in an inter-modal dataset, for each intra-modal sample in an intra-modal dataset, and a subsequent sample, wherein the inter-modal dataset and the intra-modal dataset are contained in a multi-modal training dataset. The one or more computer processors estimate an inter-modal label utilizing inter-modal label transformation of a subsequent sample. The one or more computer processors estimate an intra-modal label utilizing intra-modal label transformation of the subsequent sample. The one or more computer processors label the subsequent sample with a cross-modal label by combining the estimated inter-modal label and the estimated intra-modal label.

17 Claims, 5 Drawing Sheets

(56) References Cited

OTHER PUBLICATIONS

E. López-Iñesta, M. Arevalillo-Herráez and F. Grimaldo, "Classification-based multimodality fusion approach for similarity ranking," 17th International Conference on Information Fusion (FUSION), Salamanca, Spain, 2014, pp. 1-6. (Year: 2014).*

Mandal et al., "Label Prediction Framework for Semi-Supervised Cross-Modal Retrieval", arXiv:1905.11139v1 [cs.CV] May 27, 2019, 12 pages.

Zhang et al., "Learning Concept Taxonomies from Multi-modal Data", arXiv:1606.09239v1 [cs.CL] Jun. 29, 2016, 11 pages.

* cited by examiner

CROSS-MODAL SEMI-SUPERVISED DATA LABELING

BACKGROUND

The present invention relates generally to the field of machine learning, and more particularly to data labeling.

Data labeling is an act of processing artificial intelligence learning data by data processing personnel with the assistance of marking tools. Data labeling is important in model training to procure required supervised data.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system. The computer-implemented method includes one or more computer processors extracting respective features for each inter-modal sample in an inter-modal dataset, for each intra-modal sample in an intra-modal dataset, and a subsequent sample, wherein the inter-modal dataset and the intra-modal dataset are contained in a multi-modal training dataset. The one or more computer processors estimate an inter-modal label utilizing inter-modal label transformation of a subsequent sample. The one or more computer processors estimate an intra-modal label utilizing intra-modal label transformation of the subsequent sample. The one or more computer processors label the subsequent sample with a cross-modal label by combining the estimated inter-modal label and the estimated intra-modal label.

DETAILED DESCRIPTION

Modern retrieval systems need to support multi-modal data retrieval, that is, corresponding pictures or videos are retrieved through text. Multi-modal retrieval is commonly utilized in search engines that retrieve data related to a specific topic, where the retrieved data may include text results, video results, and image results. Efficient multi-modal retrieval systems require large quantities of data with associated multi-modal labels. Frequently, to satisfy the large data requirements of a multi-modal retrieval system, manual labeling is required. Manual labeling is an incredibly time-consuming and labor-intensive procedure. Furthermore, existing labeling methods, typically, are only utilized for single-modal data and are not applicable to multi-modal data. In addition, the rapid development of machine learning models is a critical aspect of many industries, but a significant constraint of rapid development is limited training data and data samples. The efficient creation of cognitive solutions requires enabling big data pipelines and automating access of data that is transformed and correlated in a model trained and tested for performance. Increased speed in developing accurate machine learning models utilizing large amounts of data has demonstrated a clear advantage in several industrial sectors but significant issues arise when data is not available in a sufficient quantity (e.g., training sets that result in an accurate model) thereby causing significant delays in the training and testing of machine learning models and subsequently delaying the deployment and application of the models.

Embodiments of the present invention recognize that data labeling is improved by automated cross-modal data labeling utilizing combined inter-modal and intra-modal transformation. Embodiments of the present invention recognize that cross-modal data systems are improved by considering the correlation between multiple data types. Embodiments of the present invention recognize that training time of cross-modal models is improved and reduced through cross-modal data mapper function that combines inter-modal and intra-modal labels. Embodiments of the present invention obtain accurate binary labels of unlabeled data. Embodiments of the present invention utilize a kernel function method and combine inter-modal label transformation and intra-modal label transformation to train a model. Embodiments of the present invention utilizes the trained model to automatic label subsequent samples. Embodiments of the present invention are applied to retrieval system, photo processing software, and data labeling. Implementation of embodiments of the invention may take a variety of forms, and exemplary implementation details are discussed subsequently with reference to the Figures.

The present invention will now be described in detail with reference to the Figures.

Figure 1:
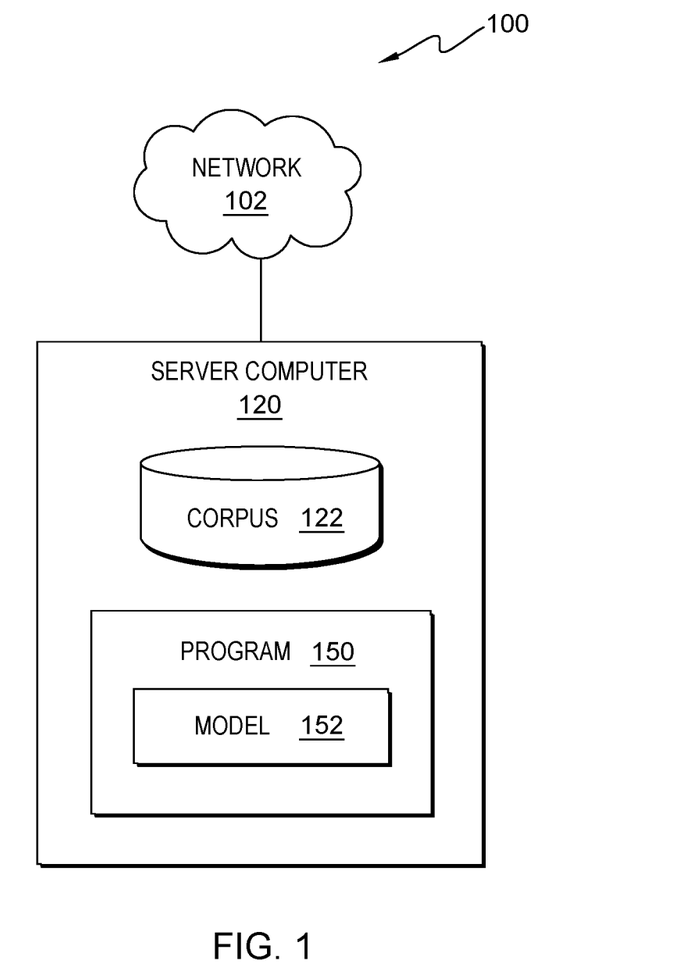
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes corpus 122 and program 150. In other embodiments, server computer 120 may contain other applications, databases, programs, etc. which have not been depicted in computational environment 100. Server computer 120 may include internal and external hardware components, as depicted and described in further detail with respect to FIG. 6.

Corpus 122 is a repository for data used by program 150. In the depicted embodiment, corpus 122 resides on server computer 120. In another embodiment, corpus 122 may reside elsewhere within computational environment 100 provided program 150 has access to corpus 122. A database is an organized collection of data. Corpus 122 can be implemented with any type of storage device capable of storing data and configuration files that can be accessed and utilized by program 150, such as a database server, a hard disk drive, or a flash memory. In an embodiment, corpus 122 stores data used by program 150, such as multi-modal datasets consisting of inter-modal samples, intra-modal samples, and respective labels. In an embodiment, corpus 122 may contain one or more sets containing a plurality of unclassified or classified (e.g., labelled) data, hereinafter referred to as samples.

Program 150 is a program for predicting cross-modal semi-supervised data labels. In various embodiments, program 150 may implement the following steps: extract respective features for each inter-modal sample in an inter-modal dataset, for each intra-modal sample in an intra-modal dataset, and a subsequent sample, wherein the inter-modal dataset and the intra-modal dataset are contained in a multi-modal training dataset; estimate an inter-modal label utilizing inter-modal label transformation of a subsequent sample; estimate an intra-modal label utilizing intra-modal label transformation of the subsequent sample; and label the subsequent sample with a cross-modal label by combining the estimated inter-modal label and the estimated intra-modal label. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Model 152 is representative of a model or function that mapper that combines inter-modal and intra-modal labels. In an embodiment, model 152 is trained relabeled cross-modal training data to label subsequent unlabeled samples. Program 150 is depicted and described in further detail with respect to FIG. 2.

The present invention may contain various accessible data sources, such as corpus 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
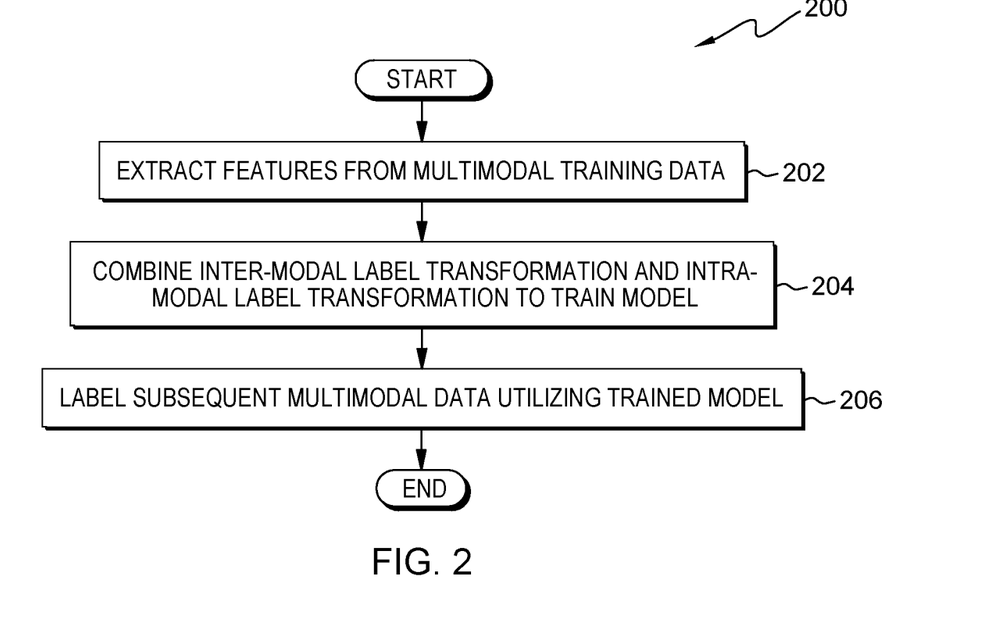
FIG. 2 is a flowchart depicting operational steps of a program, on a server computer within the computational environment of FIG. 1, for predicting cross-modal semi-supervised data labels, in accordance with an embodiment of the present invention.

FIG. 2 depicts flowchart 200 illustrating operational steps of program 150 for predicting cross-modal semi-supervised data labels, in accordance with an embodiment of the present invention.

Program 150 extracts features from multimodal training data (step 202). In an embodiment, program 150 initiates responsive to a provided corpus or training dataset containing labeled multi-modal training data. In a further embodiment, the labeled multimodal training data is partitioned into a plurality of labeled sets of text, images, and/or video. In various embodiments, program 150 initiates, starts, or commences upon an initiation of a machine learning development pipeline. In another embodiment, program 150 initiates by user request, by a user submitting or inputting the dataset (i.e., initial data set). In an embodiment, program 150 retrieves a dataset from a plurality of sources such as repositories, local storage, etc. For example, program 150 retrieves the dataset contained in a collected file or data queried from an online corpus (e.g., private cloud, or database server (e.g., corpus 122)). In an embodiment, program 150 partitions the multi-modal training data into one or more labeled inter-modal sets (e.g., textual) and one or more labeled intra-modal sets (e.g., image or video).

Responsively, program 150 extracts a plurality of features from each sample in a labeled inter-modal set and each sample in a labeled intra-modal set. In an embodiment, program 150 extracts a plurality of vectorized features from one or more textual snippets contained an inter-modal set, resulting in extracted features for each textual snippet in the inter-modal set. In this embodiment, program 150 utilizes natural language processing (NLP) techniques and corpus linguistic analysis techniques (e.g., syntactic analysis, etc.) to identify parts of speech and syntactic relations between various portions of the snippet. In another embodiment, program 150 utilizes corpus linguistic analysis techniques, such as part-of-speech tagging, statistical evaluations, optimization of rule-bases, and knowledge discovery methods, to parse, identify, and evaluate portions of the snippet. In an embodiment, program 150 utilizes part-of-speech tagging to identify the particular part of speech of one or more words in the snippet based on its relationship with adjacent and related words. In another embodiment, program 150 utilizes term frequency-inverse document frequency (tf-idf) techniques to calculate how important a term is to the snippet, conversation, document, or corpus. In another embodiment, program 150 utilizes tf-idf to calculate a series of numerical weights for the words extracted from historical snippets. In a further embodiment, program 150 utilizes said calculations to identify and weigh frequently used terms. For example, program 150 increases the weight of a word proportionally to the frequency the word appears in the snippet offset by the frequency of documents, in corpus 122, that contain the word. In an embodiment, program 150 transforms the snippet and constituent terms into a corresponding stem/root equivalent, eliminating redundant punctuation, participles, grammatical tenses, etc. In another embodiment, program 150 utilizes stop-word removal, stemming, and lemmatization to remove redundant terms and punctuation.

In an embodiment, program 150 extracts a plurality of features from one or more images contained in an intra-modal set. In this embodiment, program 150 extracts the plurality of features by identifying and tagging the regional boundaries along the bias. For example, for an intra-modal set of labelled cat images, extracted features may include classifications such as fur color, fur pattern, eye color, face profile, fur type, etc. In a further embodiment, program 150 utilizes the following as features: edge detection, identifying points in an image at which the image has discontinuities; corner, the intersection of two edges; interest points, points in an image which have a well-defined positions; blobs, regions in a digital image that differ in properties, such as brightness or color, compared to surrounding regions; ridges, one-dimensional curve that represents an axis of symmetry. In various embodiments, program 150 utilizes low-level feature detection where program 150 examines every pixel in an image to see if a feature is present in that pixel. In an embodiment, program 150 utilizes principal component analysis (PCA) to linear reduce feature dimensionality. In this embodiment, program 150 to identify a combination of the features which summarizes the original data distribution so that to reduce original dimensions.

Program 150 combines inter-modal transformation and intra-modal label transformation to train model (step 204). In an embodiment, program 150 estimates an inter-modal label by inter-modal label transformation (step 302). In an embodiment, program 150 estimates an intra-modal label by intra-modal label transformation (step 304). In an embodiment, program 150 combines the estimated inter-modal label and the inter-modal label (step 306). Responsive to a combined training dataset of combined multi-modal labels and vectors, program 150 utilizes the training dataset to train model 152, a multi-modal model. In an embodiment, based on the data of multiple structure types, as program 150 considers the correlation between each type of data, as described in FIG. 3, model 152 is automatically constructed. The combination procedure is further described and detailed in the flowchart and steps contained within FIG. 3.

Program 150 labels subsequent multimodal data utilizing the train model (step 206). In an embodiment, program 150 utilizes model 152 as a mapper function (e.g., mapper (matrix)) where subsequent inter-modal and/or intra-modal samples are classified. In various embodiments, program 150 deploys model 152 to a plurality of production, test, or auxiliary environments. In another embodiment, program 150 determines which deployment environment to deploy a model out of a plurality of deployment environments (e.g., test, production, backup server, containers, or virtual machines). In an embodiment, the user instructs program 150 to deploy a specific model to a specific environment.

Figure 3:
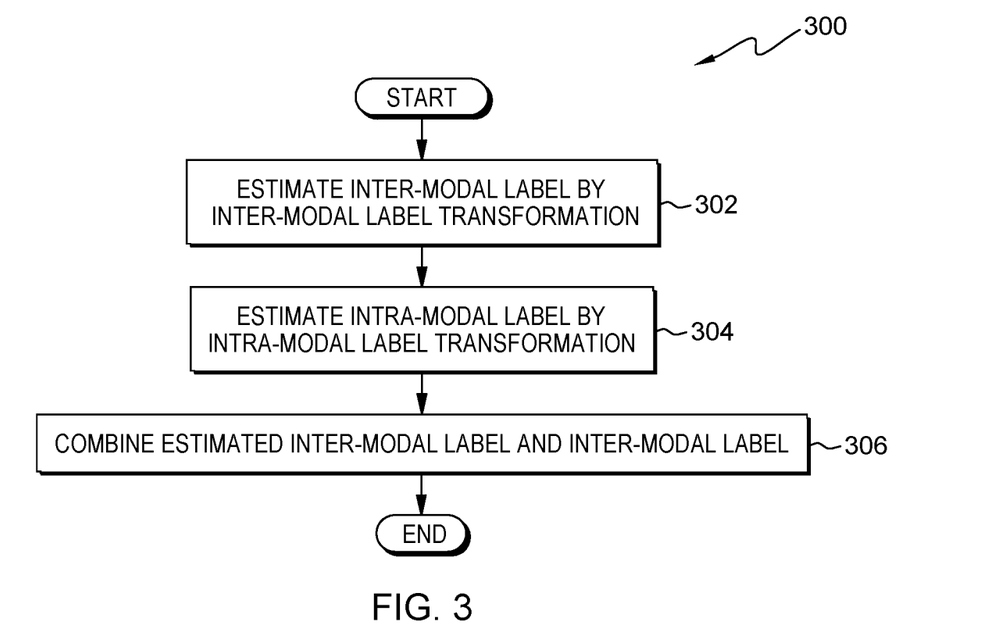
FIG. 3 is a flowchart depicting operational steps of a program, on a server computer within the computational environment of FIG. 1, for calculating and combining inter-modal labels and intra-modal labels, in accordance with an embodiment of the present invention.

FIG. 3 depicts flowchart 300 illustrating operational steps of program 150 for calculating and combining inter-modal labels and intra-modal labels, in accordance with an embodiment of the present invention.

Figure 4:
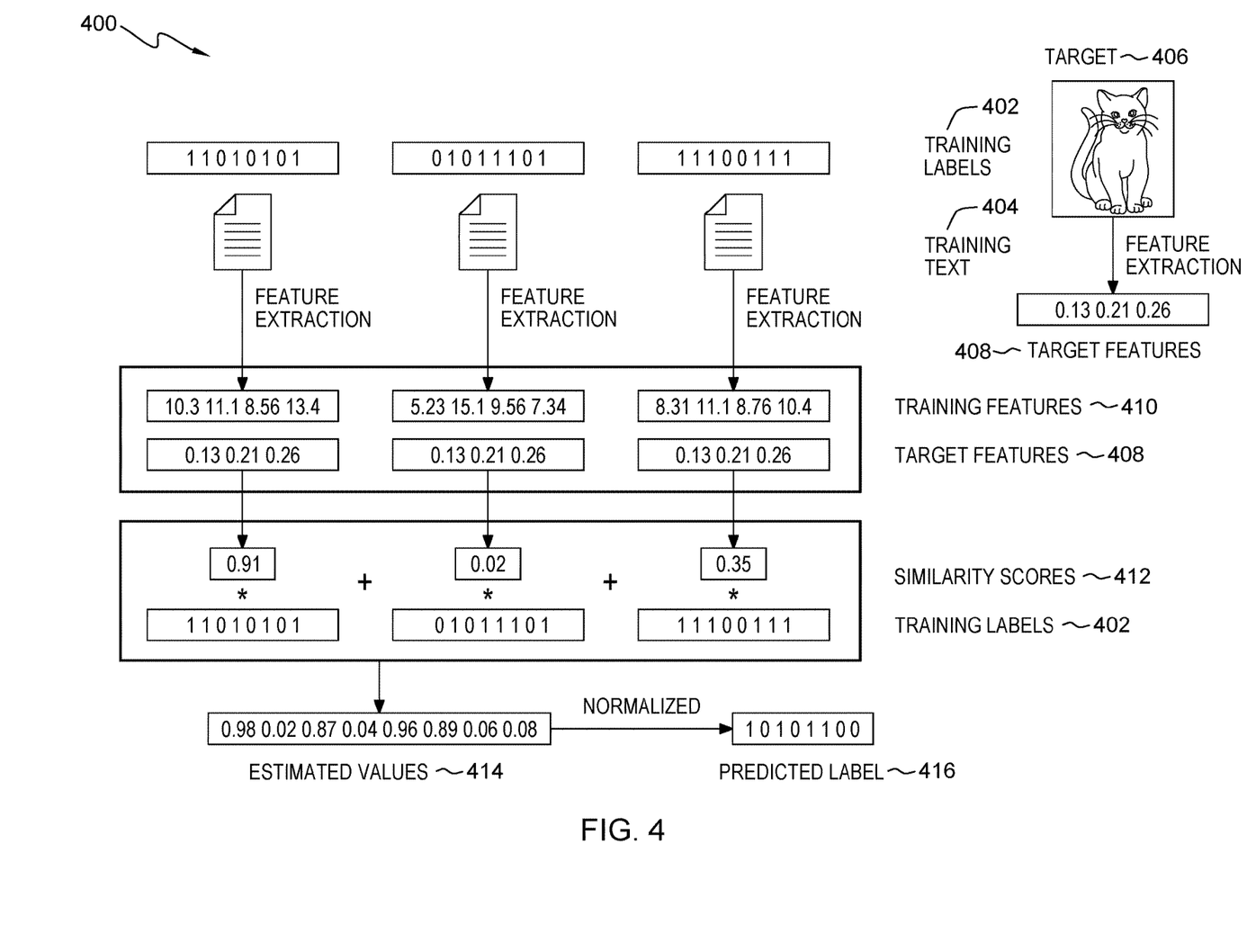
FIG. 4 depicts operational steps of inter-modal transformation, in accordance with an illustrative embodiment of the present invention.

Program 150 estimates an inter-modal label by inter-modal label transformation (step 302). In an embodiment, program 150 compares the extracted features, from step 202, to the extracted features of a subsequent inter-modal sample (e.g., target sample). For example, program 150 utilizes extracted features associated with each inter-modal sample in a set of inter-modal training data to compare (e.g., tf-idf) to an unlabeled sample or another inter-modal sample in the set of inter-modal training data (i.e., out-of-sample processing). In an embodiment, program 150 utilizes the feature comparison to obtain a similarity score, as depicted in FIG. 4. Responsively, program 150 multiplies the obtained similarity score with a vectorized label of the associated training sample, resulting in a similarity value. In an embodiment, program 150 accumulates (i.e., aggregates) all similarity values resulting in an estimated value vector, wherein the accumulated similarity values include estimated similarity values from each inter-modal sample compared to the subsequent sample. Responsively, program 150 normalizes (e.g., min-max normalization or unit vector normalization) the estimated label vector resulting in a predicted inter-modal label, where the inter-modal label is a binary vector. In an embodiment, inter-modal label transformation is formulated as:

$$f_{inter}(z) = \Sigma_i^l y_i \tan(x_i^T W^T V z), \quad \quad 1)$$

with respect to equation (1), where $\tan(x_i^T W^T V z)$ denotes a comparable semantic with $x_i^T W^T$ as an image mapper and $Vz$ as a text mapper, and $z$ is an subsequent sample.

Figure 5:
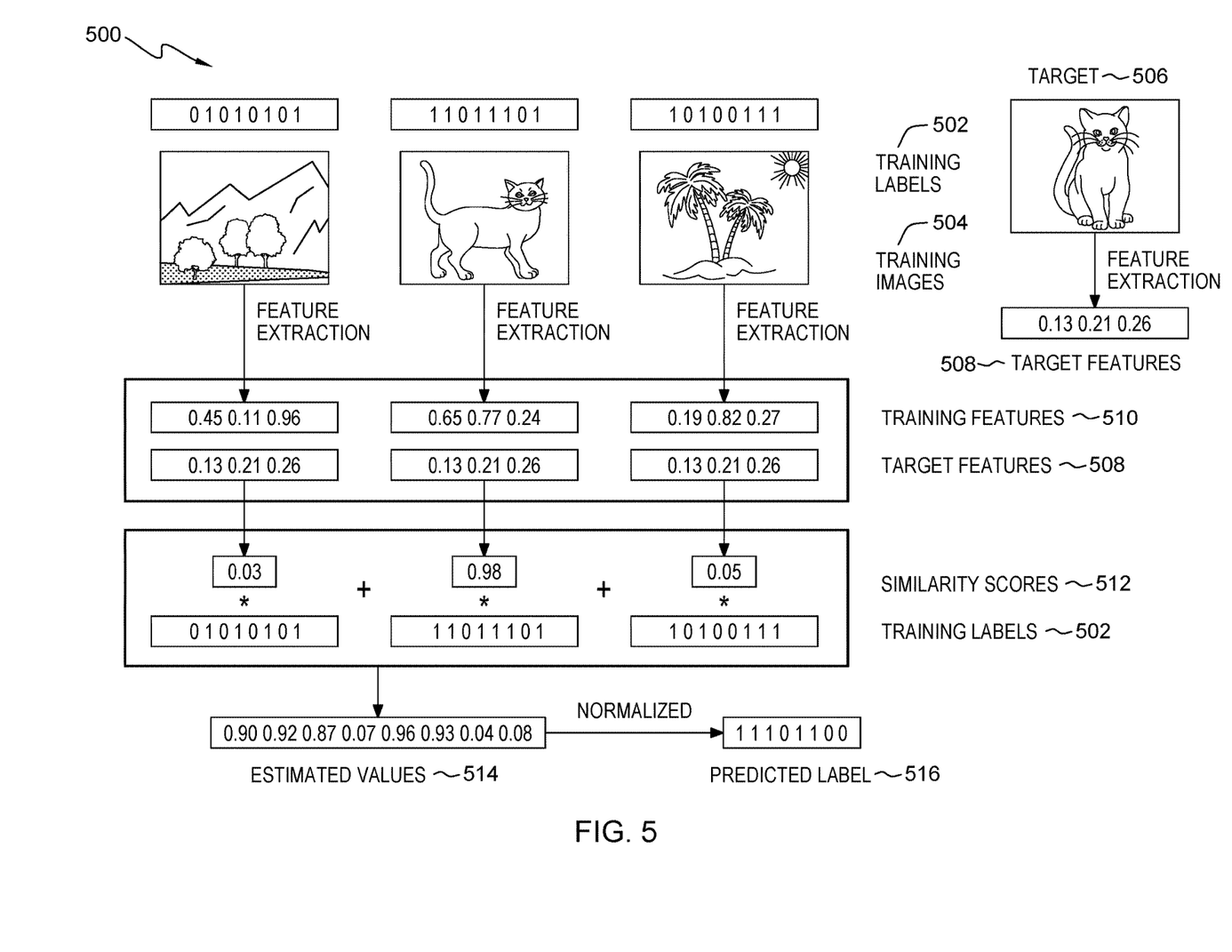
FIG. 5 depicts operational steps of intra-modal transformation, in accordance with an illustrative embodiment of the present invention.

Program 150 estimates an intra-modal label by intra-modal label transformation (step 304). In an embodiment, program 150 compares the extracted features, from step 202, to the extracted features of a subsequent intra-modal sample (e.g., target sample). For example, program 150 utilizes extracted features associated with each intra-modal sample in a set of intra-modal training data to compare to an unlabeled sample or another intra-modal sample in the set of inter-modal training data (i.e., out-of-sample processing). In an embodiment, program 150 utilizes a kernel (e.g., linear kernel, polynomial kernel, gaussian kernel, etc.) to obtain a similarity score, as depicted in FIG. 5. Responsively, program 150 multiplies the obtained similarity score with a vectorized label of the associated training sample, resulting in a similarity value. In an embodiment, program 150 accumulates all similarity values resulting in an estimated label vector, wherein the accumulated similarity values include estimated similarity values from each intra-modal sample compared to the subsequent sample. Responsively, program 150 normalizes (e.g., min-max normalization or unit vector normalization) the estimated label vector resulting in a predicted intra-modal label, where the intra-modal label is a binary vector. In an embodiment, intra-modal label transformation is formulated as:

$$f_{intra}(z) = \Sigma_j^l y_j \alpha_j K(z_j, z) \qquad 2)$$

with respect to equation (2), where z is a subsequent sample and $K(z_j, z)$ denotes a kernel.

Program 150 combines the estimated inter-modal label and the estimated inter-modal label (step 306). In an embodiment, program 150 combines the vectors representing the estimated (i.e., predicted) inter-modal label and the estimated intra-modal label resulting in a cross-modal label. In an embodiment, program 150 labels the subsequent sample with the generated cross-modal label. In a further embodiment, program 150 adds the cross-modal labelled subsequent sample to a training dataset for training of model 152. In a further embodiment, program 150 relabels each training sample in a multi-modal dataset with a respective calculated cross-modal label.

FIG. 4 depicts example 400 depicting operational steps of inter-modal transformation, in accordance with an illustrative embodiment of the present invention. In example 400, program 150 extracts training features 410 from a plurality of inter-modal data containing training text 404 and associated training labels 402. Program 150 also extracts target features 408 from target 406. Program 150 compares training features 410 with target features 408 resulting in similarity scores 412. Responsively, program 150 multiplies similarity scores 412 with associated training labels 402, resulting in estimated values 414. Program 150, then, normalizes estimated values 414 resulting in predict label 416.

FIG. 5 depicts example 500 depicting operational steps of intra-modal transformation, in accordance with an illustrative embodiment of the present invention. In example 500, program 150 extracts training features 510 from a plurality of inter-modal data containing training images 504 and associated training labels 502. Program 150 also extracts target features 508 from target 506. Program 150 compares training features 510 with target features 508 resulting in similarity scores 512. Responsively, program 150 multiplies similarity scores 512 with associated training labels 502, resulting in estimated values 514. Program 150, then, normalizes estimated values 514 resulting in predict label 516.

Figure 6:
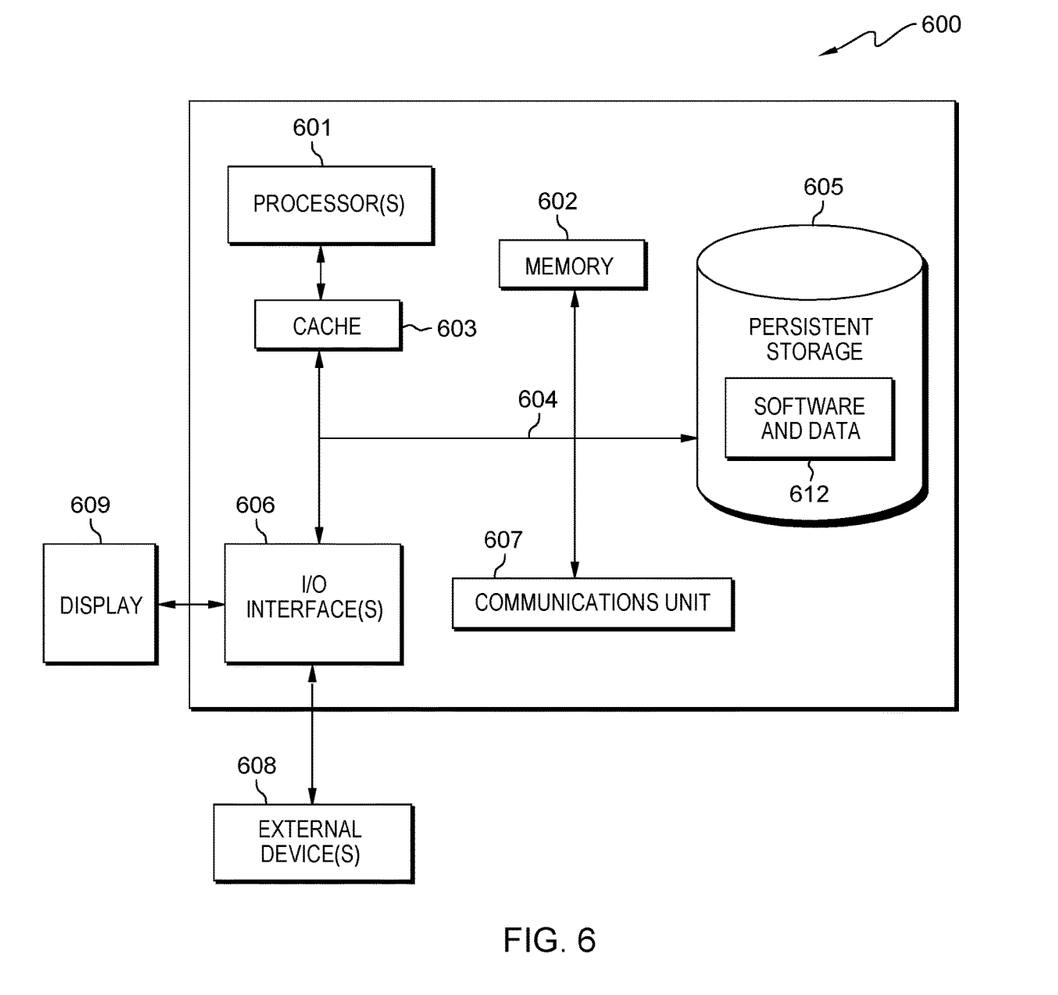
FIG. 6 is a block diagram of components of the server computer, in accordance with an embodiment of the present invention.

FIG. 6 depicts block diagram 600 illustrating components of server computer 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server computer 120 each include communications fabric 604, which provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications, and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of computer processor(s) 601 by holding recently accessed data, and data near accessed data, from memory 602.

Program 150 may be stored in persistent storage 605 and in memory 602 for execution by one or more of the respective computer processor(s) 601 via cache 603. In an embodiment, persistent storage 605 includes a magnetic hard disk drive. Alternatively, or in addition to a magnetic hard disk drive, persistent storage 605 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Software and data 612 can be stored in persistent storage 605 for access and/or execution by one or more of the respective processors 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program 150 may be downloaded to persistent storage 605 through communications unit 607.

I/O interface(s) 606 allows for input and output of data with other devices that may be connected to server computer 120. For example, I/O interface(s) 606 may provide a connection to external device(s) 608, such as a keyboard, a keypad, a touch screen, and/or some other suitable input device. External devices 608 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 605 via I/O interface(s) 606. I/O interface(s) 606 also connect to a display 609.

Display 609 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
extracting, by one or more computer processors, respective features for: (i) each inter-modal sample in an inter-modal dataset, (ii) for each intra-modal sample in an intra-modal dataset, and (iii) a subsequent sample, wherein the inter-modal dataset and the intra-modal dataset are contained in a multi-modal training dataset, wherein each intra-modal sample is an image sample and each inter-modal sample is a textual sample, comprising:
 identifying, by one or more computer processors, one or more points in an intra-modal sample that contain discontinuities;
 utilizing, by one or more computer processors, corpus linguistic analysis to evaluate each inter-model sample;
predicting, by one or more computer processors, an inter-modal label utilizing inter-modal label transformation of a subsequent sample, comprising:
 identifying, by one or more computer processors, a similarity score for each inter-modal sample in the inter-modal dataset and the subsequent sample by comparing extracted features for each inter-modal sample in the inter-modal dataset with extracted features for the subsequent sample and combining the similarity score with a vectorized label associated with the respective inter-modal sample;
 aggregating, by one or more computer processors, the combined similarity scores;
 creating, by one or more computer processors, the predicted inter-modal label by normalizing aggregated similarity scores;
predicting, by one or more computer processors, an intra-modal label utilizing intra-modal label transformation of the subsequent sample;
labeling, by one or more computer processors, the subsequent sample with a cross-modal label by combining the predicted inter-modal label and the predicted intra-modal label;
creating, by one or more computer processors, a training dataset of cross-modal labels by relabeling each training sample in the multi-modal training dataset with created cross-modal labels;
training, by one or more computer processors, a model with the created training dataset; and
classifying, by one or more computer processors, another sample utilizing the trained model.

2. The computer-implemented method of claim 1, wherein the intra-modal label transformation, comprises:
calculating, by one or more computer processors, a similarity score for each inter-modal sample in the intra-modal dataset and the subsequent sample by comparing the extracted features for each intra-modal sample in the intra-modal dataset with extracted features for the subsequent sample and multiplying the calculated similarity score with a label associated with the respective intra-modal sample,
aggregating, by one or more computer processors, the multiplied calculated similarity scores; and
creating, by one or more computer processors, a predicted intra-modal label by normalizing the aggregated similarity scores.

3. The computer-implemented method of claim 1, further comprising:
training, by one or more computer processors, a model utilizing the labeled subsequent sample.

4. The computer-implemented method of claim 1, wherein the label of the subsequent sample is a binary vector.

5. The computer-implemented method of claim 1, wherein the subsequent sample is selected from the group consisting of a textual snippet and an image.

6. The computer-implemented method of claim 1, wherein the multi-modal training dataset comprises labeled textual snippets, images, and videos.

7. A computer program product comprising:
one or more computer readable storage media and program instructions stored on the one or more computer readable storage media, the stored program instructions comprising:
program instructions to extract respective features for: (i) each inter-modal sample in an inter-modal dataset, (ii) for each intra-modal sample in an intra-modal dataset, and (iii) a subsequent sample, wherein the inter-modal dataset and the intra-modal dataset are contained in a multi-modal training dataset, wherein each intra-modal sample is an image sample and each inter-modal sample is a textual sample, wherein the program instructions comprise:
 program instructions to identify one or more points in an intra-modal sample that contain discontinuities;
 program instructions to utilize corpus linguistic analysis to evaluate each inter-model sample;
program instructions to predict an inter-modal label utilizing inter-modal label transformation of a subsequent sample, comprising:
 program instructions to identify a similarity score for each inter-modal sample in the inter-modal dataset and the subsequent sample by comparing extracted features for each inter-modal sample in the inter-modal dataset with extracted features for the subsequent sample and combining the similarity score with a label associated with the respective inter-modal sample;
 program instructions to aggregate the combined similarity scores;
 program instructions to create the predicted inter-modal label by normalizing aggregated similarity scores; and
program instructions to predict an intra-modal label utilizing intra-modal label transformation of the subsequent sample;
program instructions to label the subsequent sample with a cross-modal label by combining the predicted inter-modal label and the predicted intra-modal label;
program instructions to create a training dataset of cross-modal labels by relabeling each training sample in the multi-modal training dataset with created cross-modal labels;
program instructions to train a model with the created training dataset; and
program instructions to classify another sample utilizing the trained model.

8. The computer program product of claim 7, wherein the program instructions, to intra-modal label transformation, comprise:

program instructions to calculate a similarity score for each inter-modal sample in the intra-modal dataset and the subsequent sample by comparing the extracted features for each intra-modal sample in the intra-modal dataset with extracted features for the subsequent sample and multiplying the calculated similarity score with a label associated with the respective intra-modal sample;

program instructions to aggregate the multiplied calculated similarity scores; and program instructions to create a predicted intra-modal label by normalizing the aggregated similarity scores.

9. The computer program product of claim 7, wherein the program instructions, stored on the one or more computer readable storage media, further comprise:

program instructions to train a model utilizing the labeled subsequent sample.

10. The computer program product of claim 7, wherein the label of the subsequent sample is a binary vector.

11. The computer program product of claim 7, wherein the subsequent sample is selected from the group consisting of a textual snippet and an image.

12. The computer program product of claim 7, wherein the multi-modal training dataset comprises labeled textual snippets, images, and videos.

13. A computer system comprising:

one or more computer processors;

one or more computer readable storage media; and program instructions stored on the computer readable storage media for execution by at least one of the one or more processors, the stored program instructions comprising:

program instructions to extract respective features for:
(i) each inter-modal sample in an inter-modal dataset, (ii) for each intra-modal sample in an intra-modal dataset, and (iii) a subsequent sample, wherein the inter-modal dataset and the intra-modal dataset are contained in a multi-modal training dataset, wherein each intra-modal sample is an image sample and each inter-modal sample is a textual sample, wherein the program instructions comprise:

program instructions to identify one or more points in an intra-modal sample that contain discontinuities;

program instructions to utilize corpus linguistic analysis to evaluate each inter-model sample;

program instructions to predict an inter-modal label utilizing inter-modal label transformation of a subsequent sample, comprising:

program instructions to identify a similarity score for each inter-modal sample in the inter-modal dataset and the subsequent sample by comparing extracted features for each inter-modal sample in the inter-modal dataset with extracted features for the subsequent sample and combining the similarity score with a label associated with the respective inter-modal sample;

program instructions to aggregate the combined multiplied calculated similarity scores;

program instructions to create the predicted inter-modal label by normalizing aggregated similarity scores; and program instructions to predict an intra-modal label utilizing intra-modal label transformation of the subsequent sample;

program instructions to label the subsequent sample with a cross-modal label by combining the predicted inter-modal label and the predicted intra-modal label;

program instructions to create a training dataset of cross-modal labels by relabeling each training sample in the multi-modal training dataset with created cross-modal labels;

program instructions to train a model with the created training dataset; and program instructions to classify another sample utilizing the trained model.

14. The computer system of claim 13, wherein the program instructions, to intra-modal label transformation, comprise:

program instructions to calculate a similarity score for each inter-modal sample in the intra-modal dataset and the subsequent sample by comparing the extracted features for each intra-modal sample in the intra-modal dataset with extracted features for the subsequent sample and multiplying the calculated similarity score with a label associated with the respective intra-modal sample, program instructions to aggregate the multiplied calculated similarity scores; and program instructions to create a predicted intra-modal label by normalizing the aggregated similarity scores.

15. The computer system of claim 13, wherein the program instructions, stored on the one or more computer readable storage media, further comprise:

program instructions to train a model utilizing the labeled subsequent sample.

16. The computer system of claim 13, wherein the label of the subsequent sample is a binary vector.

17. The computer system of claim 13, wherein the subsequent sample is selected from the group consisting of a textual snippet and an image.

* * * * *